United States Patent [19]

Morgan et al.

[11] Patent Number: 5,057,690

[45] Date of Patent: Oct. 15, 1991

[54] BATTERY DRIVEN 8 CHANNEL PULSE HEIGHT ANALYZER WITH COMPACT, SINGLE GAMMA-PEAK, DISPLAY

[75] Inventors: John P. Morgan; Thomas C. Piper, both of Idaho Falls, Id.

[73] Assignee: The United States of America as represented by the Department of Energy, Washington, D.C.

[21] Appl. No.: 574,405

[22] Filed: Aug. 29, 1990

[51] Int. Cl.[5] ............................................. G01T 1/00
[52] U.S. Cl. .......................... 250/336.1; 250/370.01; 250/370.06
[58] Field of Search ............ 250/336.1, 370.01, 370.06

[56] References Cited

U.S. PATENT DOCUMENTS

| | | | |
|---|---|---|---|
| 2,806,145 | 9/1957 | Cotty | 250/370.01 |
| 4,092,980 | 6/1978 | Frank et al. | 250/363.02 X |
| 4,197,836 | 4/1980 | Wagner et al. | 250/363.02 X |
| 4,267,446 | 5/1981 | Brown et al. | 250/255 |
| 4,862,004 | 8/1989 | Koike et al. | 250/369 |
| 4,893,013 | 1/1990 | Denen et al. | 250/336.1 |
| 4,959,547 | 9/1990 | Carroll et al. | 250/336.1 |

Primary Examiner—Constantine Hannaher
Assistant Examiner—Edward J. Glick
Attorney, Agent, or Firm—Tyrone Davis; Thomas G. Anderson; William R. Moser

[57] ABSTRACT

The invention comprises a hand-held wand including an l.e.d. display and a NaI photomultiplier tube encased in lead or other suitable gamma shielding material, and an electronics and battery back-pack package connected to the wand.

9 Claims, 4 Drawing Sheets

BLOCK DIAGRAM OF PHA PULSE PROCESSING AND STORAGE

BATTERY DRIVEN 8 CHANNEL PULSE HEIGHT ANALYZER WITH COMPACT, SINGLE GAMMA-PEAK, DISPLAY

CONTRACTUAL ORIGIN OF THE INVENTION

The United States Government has rights in this invention pursuant to Contract No. DE-AC07-84ID12435 between the United States Department of Energy and Westinghouse Electric Company.

BACKGROUND OF THE INVENTION

The invention is an 8 channel pulse height analyzer using an 8×32 dot light emitting diode (l.e.d) display. Various industrial personnel have expressed an interest in a device having the ability to search for the presence of a single dedicated gamma ray inside pipes, tubes, and equipment. They wished to be able to "point" a device at the area of interest and have it respond. For example, U-235 emits a 186 keV gamma that can penetrate ¼ inch of steel and is easily detected by a NaI photomultiplier tube. Normally, presence of the 186 keV line would be indicated by use of a conventional 1024 channel pulse height analyzer, which is a laboratory piece of equipment having the ability to detect a wide range of gamma rays and not having the ability to be dedicated to a single gamma-line display. By mounting the l.e.d display on the side of the photomultiplier and by battery powering the electronics, the NaI photomultiplier tube with display becomes a wand. The presence of the gamma of interest is indicated by the growth in amplitude of the peak shape of the line on the l.e.d display. The "wand" assembly is powered and the display driven via two ¼" diameter, 20 foot long cables coming from a 15 pound portable electronics and battery package. The concept of displaying a single gamma-line, or absorption edge, with a low cost x-y display also can be adapted to many other usages where it would aid an operator adjusting electronics to their proper setting.

Pulse height analyzers present a display of pulse-height frequency-of-occurrence versus pulse height. This is achieved by dividing the possible pulse height range into several, equal, height-segments; assigning a counter to each equal height segment; analyzing the height of each incoming pulse; and adding a count to the appropriate counter. As more and more pulses are analyzed, the pulse height frequency versus pulse-height information develops within the set of counters. Display of the pulse height information can be done concurrently with data accumulation. The content of the several counters is accumulated and plotted vertically against counter identity (i.e. pulse height) horizontally. Conventional laboratory models such as ND66 XP Transportable Multichannel Analyzer/Computer System by Nuclear Data Inc., and NS-700 Series Pulse Height Analyzer by Tracor Northern generally require more extensive technical expertise to operate and determine what particular gamma-line is present. Furthermore, experience has indicated that it is usually impractical to use such devices in an industrial setting, due to their bulk and extreme sensitivity. Moreover, conventional pulse height analyzers are typically not designed to be portable, nor are they dedicated to a single gamma-line occurrence.

SUMMARY OF THE INVENTION

The battery operated, eight-channel, pulse height analyzer was developed to be dedicated to detect radiation of an element and display the gamma-line of that element. The invention as presented consists of a two component system including back-pack and hand-held portions. The heavier, back-pack, portion of the system contains the batteries and the majority of the electronics. The second, the hand-held portion of the system consists of the NaI detector and photomultiplier tube encased in lead to shield it from resident gamma-rays. Resident gamma-rays are those rays that are emitted by articles in the surrounding environment that are not under examination. An 8 channel × 32 high l.e.d. pulse height analyzer display is attached to the photomultiplier tube. The display also has seven control push-buttons: 4 sensitivity selections and start, stop and reset.

A computer and various memory locations are used for count tallying rather than separate several-bit binary counters. For display, the eight channel unit described uses an array of light emitting diodes 8 wide by 32 high whereas the typical laboratory 1024 channel Phase Height Analyzer uses a cathode ray tube. The low height (thickness) of the l.e.d display compared to a CRT permits the 8 channel display to be mounted on the side of the NaI photomultiplier gamma sensor for convenient viewing, in any light condition as the NaI sensor is directed toward potential gamma-ray sites.

It is an object of the invention to provide a hand-held high resolution battery powered spectrometer having the ability to be used in all light conditions.

It is another object of the invention to provide a battery powered spectrometer having the ability to display a single gamma peak and allowing for the use of this invention by minimally trained operators. It is an additional object to provide a solid state design suitable for use in an industrial setting adaptable as an aid in setting up and operating single channel in-line gamma monitors.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, the invention may comprise a wand including an l.e.d. display and a NaI photomultiplier tube encased in lead or other suitable gamma shielding material, and an electronics and battery back-pack package connected to the wand.

BRIEF DESCRIPTION OF THE DRAWINGS

The accompanying drawings, which are incorporated in and form part of the specification, illustrate an embodiment of the of the present invention and together with the description, serve to explain the principles of the invention. In the drawings.

DETAILED DESCRIPTION OF THE INVENTION

Figure 1:
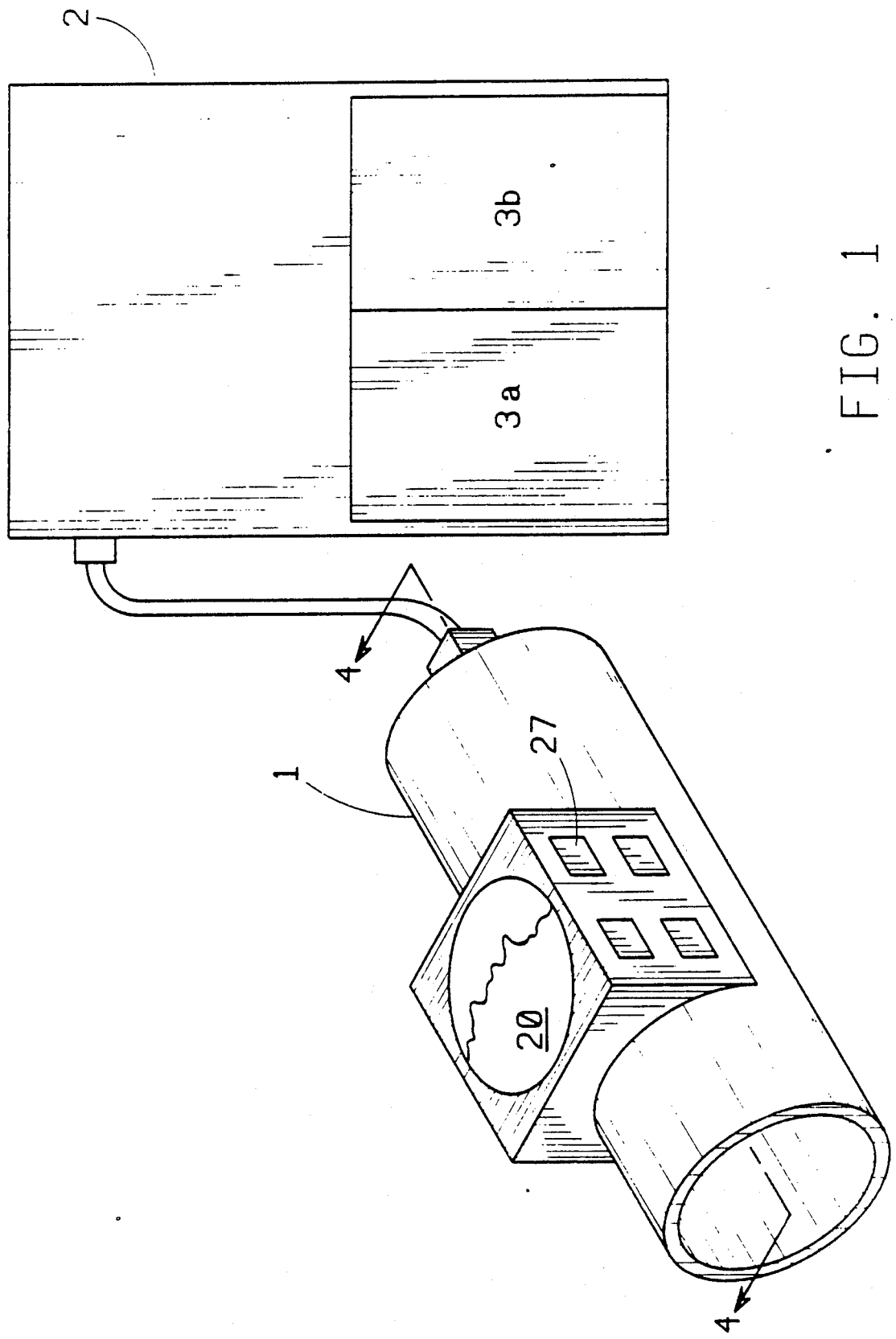
FIG. 1, shows an embodiment of the invention.
Figure 2:
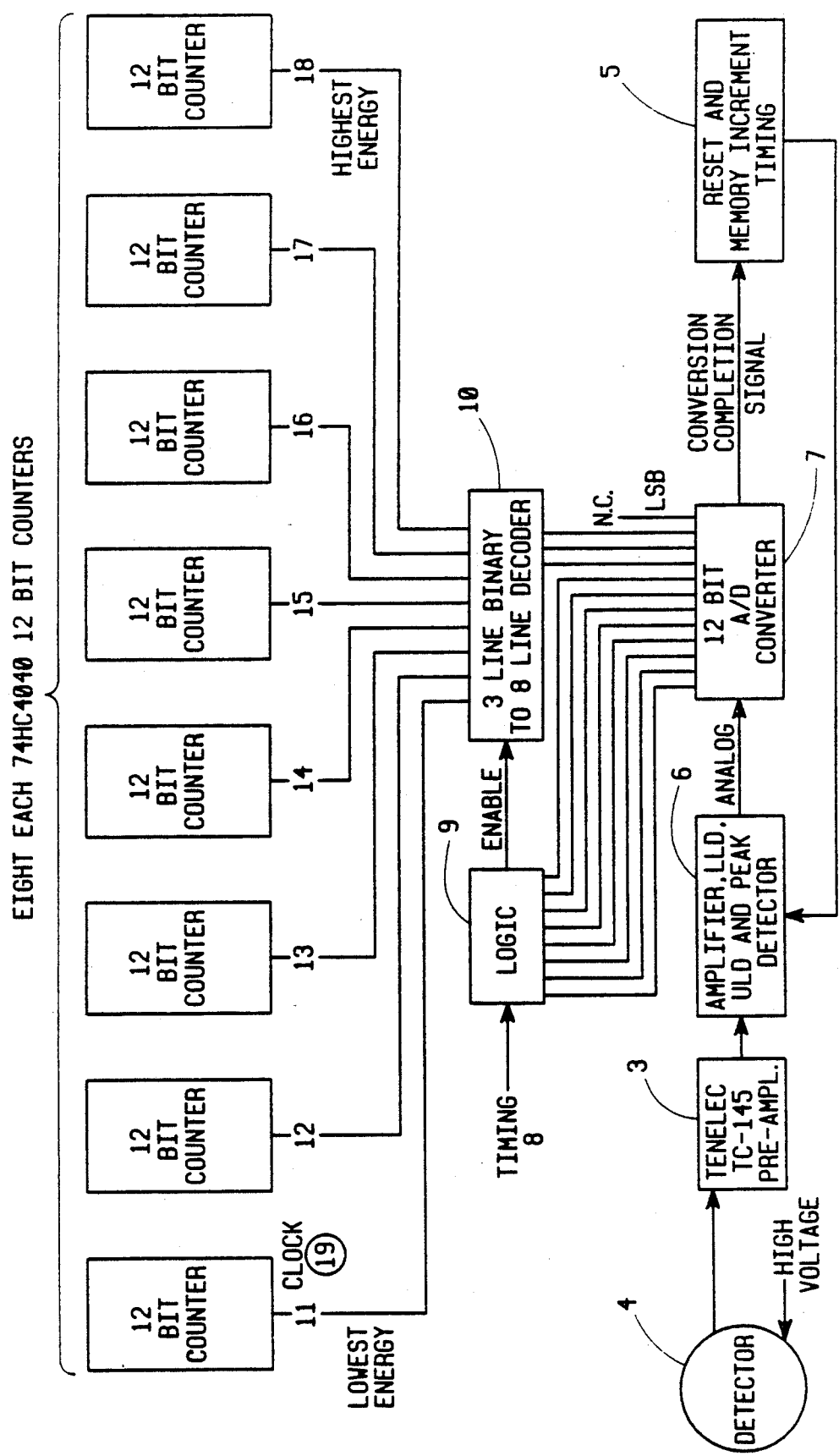
FIG. 2, is a block diagram of the invention.

Referring to FIGS. 1 and 2, the invention consists of a hand-held unit 1 and a portable power unit 2 which includes two twelve volt, rechargeable, batteries 3a & 3b that provide raw + 12 volt power to three dc/dc converters giving regulated +5, +15 and +980 volt outputs to the electronics and the photomultiplier tube 4 respectively.

The pulse signals from the NaI photomultiplier tube 4 are routed, processed and finally accumulated in eight 12-bit-binary counter "memories". Electrical pulses are generated by the NaI photomultiplier tube 4. These signal pulses pass by cable to the back-pack unit 2 and are amplified by a Tennelec TC-145 preamplifier 3 and passed to the main wire-wrap board circuitry 6 where they are amplified more and peak detected. Finally, an analog to digital convertor 7 changes the peak analog height to digital format and sends a signal to reset the memory and timing 5. If the pulse analog amplitude lies outside the LLD (lower level discriminator) and the ULD (upper level discriminator) span it is discarded without analog to digital conversion. Pulses within the LLD and ULD range are converted by the analog-to-digital convertor and discarded unless the digital format shows they lie within the eight channel display range of interest. A three-to-eight line decoder 10 such as the Texas Instruments 74LS138, is connected to the appropriate three binary output lines of the analog-to-digital convertor. Along with appropriate timing-logic routes 8 and 9 an incremental count to the correct one of eight counters 11-18 is conducted when a pulse is within range.

For example, when the gamma ray for a U-235 is detected the energy width represented by the eight counters 11-18 is selected to be just slightly larger than the natural width of the 186 keV U-235 as generated by the NaI phototube, the 186 keV line shows up on the eight channel display 20 as a rough outline of a peak. The peak is centered in the display 20 with the two outer-channel l.e.d.'s back down at background level.

Figure 3:
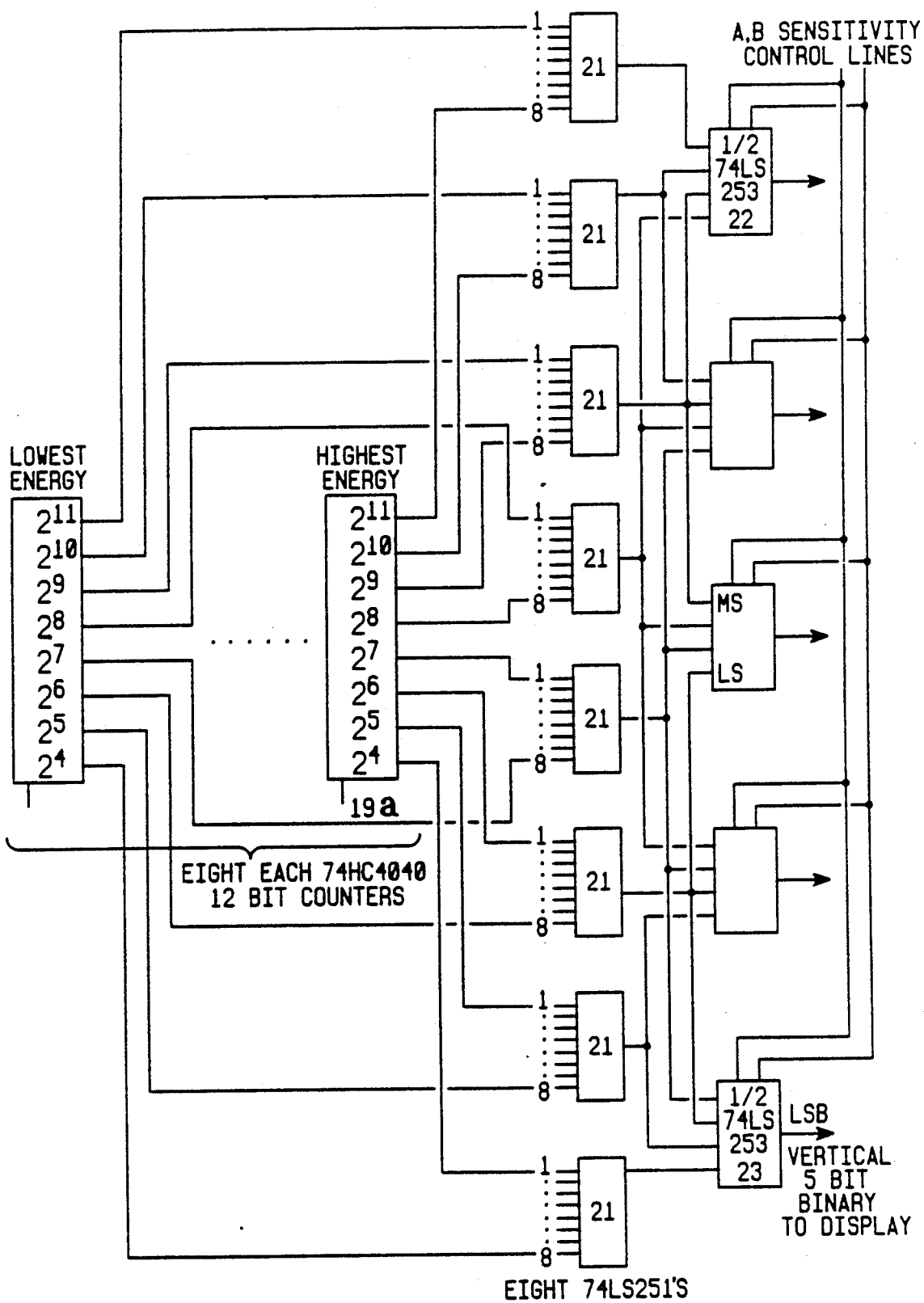
FIG. 3, is a block diagram of the electrical layout.

Display-of-the-contents of the eight 12-bit counters 11-18 is achieved and described below. The binary counter type memory 11-18 is incremented "serially" by toggling the appropriate counter clock line 19. Referring to FIG. 3, the counter chips also have pins giving the on or off status of each of the twelve binary bits so the contents are continually available in "parallel" format. An AD654 oscillator (not shown) serves to generate a "horizontal sweep" for displaying the contents of the "memory". This oscillator drives a counter 19a to generate a three-binary-bit horizontal address. This three-line address is routed to all the line selector chips 21 as well as to the detector or display electronics so that both portions of the system know which of the eight counter contents is being routed to the display. The appropriate on or off contents of the $2^{11}$ through the $2^4$ binary bit weights of that counter are passed in parallel fashion through the eight selector chips 21. Five of these bit weights, as selected by the sensitivity selection push buttons 27 on the hand-held portion of the system, pass through the two 4-line-to-1-line detectors 22 and 23 to the hand-held detector or display, electronics. There, the signal is converted from the 5-line-binary bit weight of a 1-of-32-line vertical output. The one-of-thirty-two lines selected turns on a single l.e.d. at the appropriate vertical and horizontal locations. All eight memory counters 11-18 are scanned and displayed about 30 times per second to give the appearance of a constant display. The remote sensitivity buttons 27 allow a selection made by the operator to be sent from the display 20 to the back pack electronics by the 2-binary line set called "A, B sensitivity control."

Figure 4:
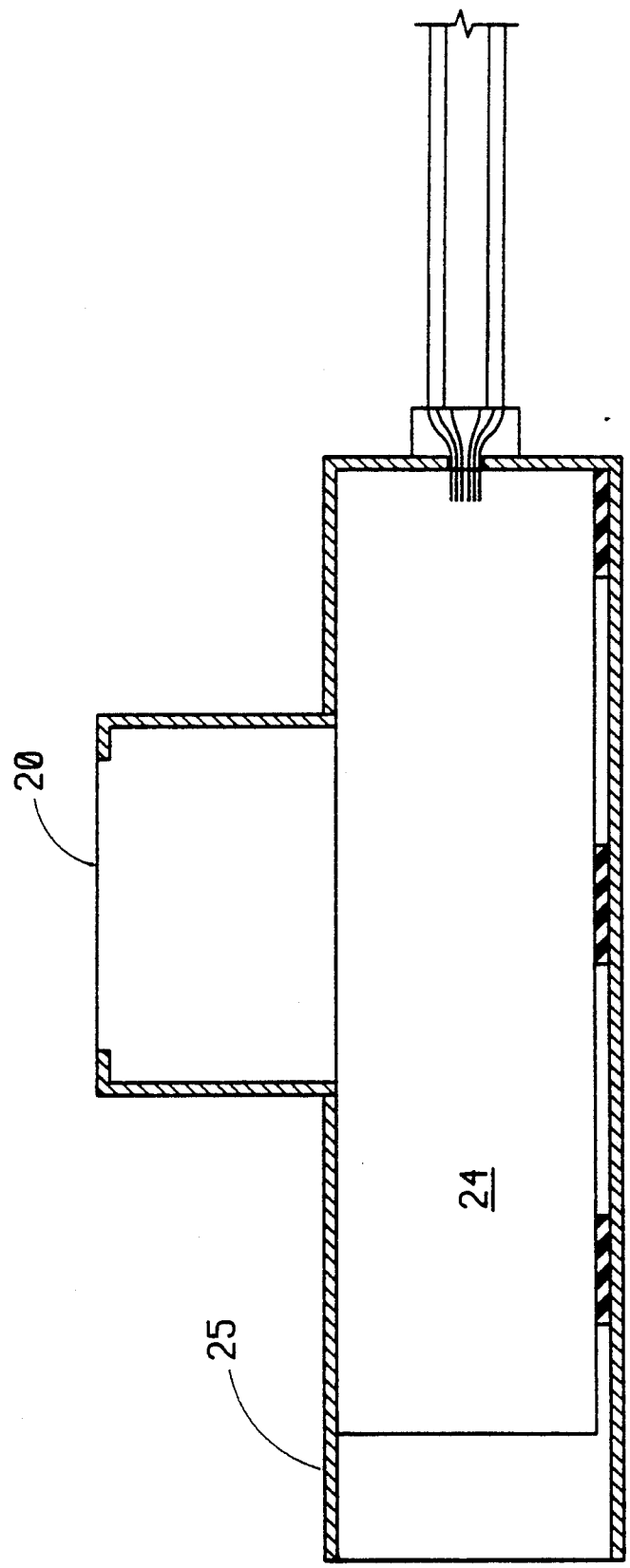
FIG. 4, is a cut-away of the hand-held unit of the invention shown in FIG. 1.

FIG. 4 is a detailed showing of the hand-held wand unit 1A. This unit includes a photomultiplier tube 24 which can detect gamma rays. A gamma shield 25 surrounds the tube 24 allowing the operator to detect rays emitting from only the scanned area. The shield 25 blocks out interfering resident gamma emissions from the photomultiplier tube. The shield can be made of lead or any other suitable gamma blocking material. Finally, a display 20 is mounted on the wand to allow the operator to immediately detect the presence of the gamma-line and its strength.

The foregoing description of the preferred embodiment of the invention has been presented for purposes of illustration and description. It is not intended to be exhaustive or to limit the invention to the precise form disclosed, and obviously many modifications and variations are possible in light of the above teaching.

The embodiments of the invention in which an exclusive property or privilege is claimed are defined as follows:

1. An apparatus for the detection and analysis of gamma rays of an element comprising:
   means for detection including a hand-held unit having the ability to detect and analyze said gamma rays, thereby generating a signal by using the pulse-height frequency-of-occurrence versus pulse-height of said gamma rays, and including means for displaying having the ability to display said signal as a single gamma line of an object for said element;
   means for shielding resident gamma emissions encasing said means for detection including a lead tube having an open end and a closed end with an observation port located between said open and closed ends allowing visual access to said means for displaying; and
   means for portable power connected to and receiving a signal from said means for detection and having the ability to amplify said signal from said means for detection.

2. The apparatus according to claim 1 wherein said hand-held unit comprises:
   a photomultiplier tube dispose in said means for shielding and having said means for displaying mounted through said observation port and in communication with said photomultiplier tube.

3. The apparatus according to claim 2 wherein said means for portable power comprises:
   a battery powered back-pack.

4. An apparatus for the detection and analysis of gamma rays of an element comprising:
   a battery powered back-pack;
   a hand-held detection unit connected to said battery powered back-pack generating an electrical pulse in response to the presence of gamma rays;
   a gamma shielding tube including an observation port encasing said hand-held detection unit;
   preamplifier means having the ability to receive said electrical pulse from said hand-held detection unit;
   amplifier means receiving said electrical pulse from said preamplifier means and amplifying said electrical pulse;

discriminator means having the ability to determine if said electrical pulse lies within a predetermined lower and upper level;

analog to digital convertor means wherein if said electrical pulse lies within said predetermined lower and upper level said analog to digital convertor means converts and transmits an electrical signal;

a line decoder is connected to said analog to digital convertor means and receives said electrical signal from said analog to digital convertor means;

a timing and logic circuit receiving a signal from said analog to digital convertor means and sending a signal to said line decoder;

at least eight 12 bit counters receiving and transmitting said signal from said line decoder.

means for counting connected to said eight bit counters and having the ability to generate a line address signal; and means for displaying mounted through said observation port allowing visual access to said display means having the ability to receive said line address signal from said means for counting and generate a gamma-line display.

5. The apparatus according to claim 4 wherein said means for displaying comprises:

an l.e.d. display screen connected to said hand-held detection unit.

6. The apparatus according to claim 5 wherein said gamma shielding tube comprises:

a lead tube having an open end and a closed end with said observation port located therebetween.

7. The apparatus according to claim 6 wherein said hand-held detection unit comprises:

a photomultiplier tube disposed in said means for shielding and having said means for displaying mounted through said observation port and in communication with said photomultiplier tube.

8. The apparatus according to claim 7 wherein said line decoder comprises:

a three-to-eight line decoder.

9. The apparatus according to claim 8 wherein said battery powered back-pack comprises:

a rechargeable battery combination.

* * * * *